United States Patent
Kim

(10) Patent No.: US 7,387,664 B2
(45) Date of Patent: Jun. 17, 2008

(54) WET TYPE AIR CLEANER

(75) Inventor: Woong Kim, Seoul (KR)

(73) Assignee: Daewoo Electronics Corporation, Seoul (KR)

( * ) Notice: Subject to any disclaimer, the term of this patent is extended or adjusted under 35 U.S.C. 154(b) by 259 days.

(21) Appl. No.: 11/268,489

(22) Filed: Nov. 8, 2005

(65) Prior Publication Data

US 2006/0097411 A1 May 11, 2006

(30) Foreign Application Priority Data

Nov. 8, 2004 (KR) .................. 10-2004-0090610
Nov. 17, 2004 (KR) .................. 10-2004-0094304

(51) Int. Cl.
*B01F 3/04* (2006.01)

(52) U.S. Cl. .................. 96/270; 96/281; 96/284; 96/286; 261/88

(58) Field of Classification Search .................. 96/270, 96/273, 280–284, 286, 287, 319; 261/88
See application file for complete search history.

(56) References Cited

U.S. PATENT DOCUMENTS

| | | | | |
|---|---|---|---|---|
| 1,378,716 A * | 5/1921 | Nielsen et al. | ................. | 261/84 |
| 1,894,864 A * | 1/1933 | Hall | ................. | 261/91 |
| 1,952,269 A * | 3/1934 | Lundquist | ................. | 261/91 |
| 2,396,526 A * | 3/1946 | Nilsson | ................. | 96/265 |
| 2,527,015 A * | 10/1950 | Lhota | ................. | 261/91 |
| 3,552,097 A * | 1/1971 | Grasseler | ................. | 96/282 |
| 3,693,326 A * | 9/1972 | Deane | ................. | 96/282 |
| 3,760,567 A * | 9/1973 | Stalker | ................. | 96/282 |
| 3,853,515 A | 12/1974 | Davis | | |
| 4,157,249 A | 6/1979 | Namy | | |
| 4,294,781 A * | 10/1981 | Holmquist | ................. | 261/89 |
| 4,594,081 A * | 6/1986 | Kroll et al. | ................. | 96/235 |
| 2006/0096461 A1* | 5/2006 | Kim et al. | ................. | 96/283 |
| 2006/0102000 A1* | 5/2006 | Kim et al. | ................. | 96/235 |
| 2006/0102001 A1* | 5/2006 | Shin | ................. | 96/283 |

FOREIGN PATENT DOCUMENTS

| | | |
|---|---|---|
| DE | 20312576 | 11/2003 |
| GB | 15134 | 4/1915 |
| GB | 2014470 | 8/1979 |

* cited by examiner

*Primary Examiner*—Scott Bushey
(74) *Attorney, Agent, or Firm*—Bacon & Thomas PLLC

(57) ABSTRACT

A wet type air cleaner includes a cylindrical housing provided with an air inlet at a top surface thereof and at least one of air outlets at a lateral surface thereof, for storing cleaning water in a bottom portion thereof, a blower unit including a fan having a spray unit incorporated thereon, for sending indoor air introduced through the air inlet downward while dispersing the cleaning water, and a water supply unit for supplying the cleaning water contained in the housing to the fan, to thereby allow the cleaning water to be sprayed to contact the air introduced through the air inlet, while adsorbing foreign substances contained in the air.

6 Claims, 5 Drawing Sheets

WET TYPE AIR CLEANER

FIELD OF THE INVENTION

The present invention relates to a wet type air cleaner; and, more particularly, to a wet type air cleaner capable of effectively removing noxious substances from air drawn into the air cleaner by means of directing the air into cleaning water contained in the housing, while maximizing a contact between the air and the cleaning water.

BACKGROUND OF THE INVENTION

In general, an air cleaner is an apparatus for discharging clean air after removing contaminants from indoor air containing fine dusts, various noxious gases, various germs, molds, viruses, etc., by using a purification medium. Such an air cleaner can be used through all seasons because it has various functions of removing unpleasant odors and small particles such as ticks, pollen and furs of pets, preventing an outbreak of disease due to an aerial infection, and so forth as well as its principal function of maintaining indoor air clean and pleasant.

Air cleaners can be largely classified into two types: dry type and wet type. Dry type air cleaners can be divided again into a filter type and an electric dust collection type.

Here, the dust collection type air cleaner employs no filter, so it has a merit in that there is no need to replace filters. However, if dusts are accumulated on an electric dust collecting plate, purifying efficiency of the air cleaner will be deteriorated, and dust removing capacity thereof will also be undermined.

As for the filter type air cleaner, on the other hand, since various fine particles are captured while air passes through filters, the filter type air cleaner exhibits a high purifying efficiency, and thus is adequate for use in a season in which yellow dust comes. However, since the filters need to be replaced periodically, maintenance cost is high.

Meanwhile, a wet type air cleaner employs a method for making floating particles in suctioned air deposited in water by allowing the suctioned air to contact water. Though the wet type air cleaner has not been commonly utilized yet, it has many advantages in that it does not requires a replacement of filters and generates little noise, while providing a humidifying function as well. Thus, for children, its use is preferred. However, when using the dry type air cleaner, water should be replaced or replenished, which would be rather troublesome.

FIG. 1 shows an exemple of a conventional wet type air cleaner, which is disclosed in Korean Patent No. 10-0205566 entitled "Air cleaner".

As shown in FIG. 1, a water filter 12 is installed at an air suction inlet 11. The water filter 12 discharges water to wash away dusts or germs in air, while releasing minerals. A water tank 19 circulates water through the water filter 12. Also, a water tray 13 is disposed at an upper side of the water filter 12 and is connected to a water pump 22 via a water supply line 23. The water pump 22 is connected to the water tank 19 or a water supply unit 24 via a connection line 21 to pump up water into the water tray 13 of the water filter 12. A water supply valve 25 is installed on the connection line 21, and a controller 29 controls the water supply valve 25 to be opened or closed.

Moreover, a float switch 26 is provided in the water tank 19, and a water waste valve 27 is installed on a waste water exhaust line 28. The float switch 26 and the water waste valve 27 are also connected to the controller 29 electrically.

An air blowing fan 18 is installed on the side of a rear discharge port 16 of the water filter 12, and the fan 28 is rotated by a motor 17 to suck in air through the air inlet. The motor 17 is coupled to a motor driving circuit 30 connected with the controller 29.

Also, the water tray 13 and a collection tray 14 are disposed at upper and lower sides of the water filter 12, respectively, and a number of water plates 15 are slantingly laminated between the water tray 18 and the collection tray 14 at a preset interval.

The conventional air cleaner configured as described above removes noxious substances such as dusts or gems from the air by means of a water filter, and discharges minerals beneficial for human body.

However, in the conventional air cleaners, an air passage is formed such that air is made to pass through the filter into which flowing water is introduced. Therefore, the time period for the air to contact cleaning water is limited to a time period for the air to pass through the filter. As a result, the time during which the cleaning water adsorbs noxious substances from the air is not enough, so that the efficiency for purifying the air cannot be improved over a certain level.

Besides, since the conventional air cleaners has a complicated structure and a great number of components, time and costs for the fabrication of the air cleaner cannot be reduced, which is a limiting factor in reducing the price of the air cleaner.

In order to solve the above-mentioned problems, there is suggested a wet type air cleaner having a simple structure in which cleaning water is stored in a certain space, and a blower unit and a water spray unit are installed in a same space. One of such wet type air cleaners is disclosed in Japanese Patent Laid-open Publication No. 2000-334240, entitled "WET TYPE AIR CLEANER".

The wet type air cleaner includes an air circulation passage through which air is introduced into the inside of the air cleaner and then is outputted to the outside after being purified. The air cleaner further includes a blower unit for allowing the air to be circulated through the air circulation passage and a spray unit for spraying the liquid into a spray space in the reservoir.

The blower unit includes a fan for suctioning the air into the spray space and a motor for driving the fan. The spray unit includes a pump for pumping up the liquid from the air cleaner and a nozzle for spraying the liquid into the spray space.

Further, the air supplied into the air circulation passage typically flows downward after being introduced into the air cleaner from upside, whereas the liquid is sprayed upward from downside. Therefore, the air introduced into the air cleaner is brought into contact with fine liquid particles sprayed by the nozzle, thereby allowing noxious substances in the air to be adsorbed by the liquid.

In the conventional wet type air cleaners as described above, however, the blower unit for circulating the indoor air and the spray unit for spraying the liquid are installed individually. Therefore, the number of components of the air cleaner cannot be reduced below a certain level.

Besides, in the conventional wet type air cleaner, droplets adsorbing fine dust are discharged outside together with the air, thereby resulting in poor purification efficiency and an unexpected high humidity. Moreover, the contact between the cleaning water and the air is insufficient, so that the purification ability thereof is deteriorated.

SUMMARY OF THE INVENTION

It is, therefore, an object the present invention to provide a wet type air cleaner having a plurality of spray units, capable of removing noxious substances from indoor air drawn into the air cleaner by allowing the air to be directed into the cleaning water sprayed by the spray units and thus maximizing a contact area between the indoor air and the cleaning water.

In accordance with the present invention, there is provided a wet type air cleaner comprising: a housing provided with an air inlet at a top surface thereof and at least one of air outlets at a lateral surface thereof, the housing containing cleaning water therein; a blower unit, fixedly installed at a rotation shaft and having a spray unit incorporated thereon, for forcing air introduced through the air inlet to blow downward while dispersing the cleaning water supplied thereto; and a water supply unit for supplying the cleaning water contained in the housing to the fan, to thereby allow the cleaning water to be sprayed to contact the air introduced through the air inlet, while adsorbing foreign substances contained in the air.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Hereinafter, a wet type air cleaner in accordance with a preferred embodiment of the present invention will be described in detail with reference to the accompanying drawings.

Figure 1:
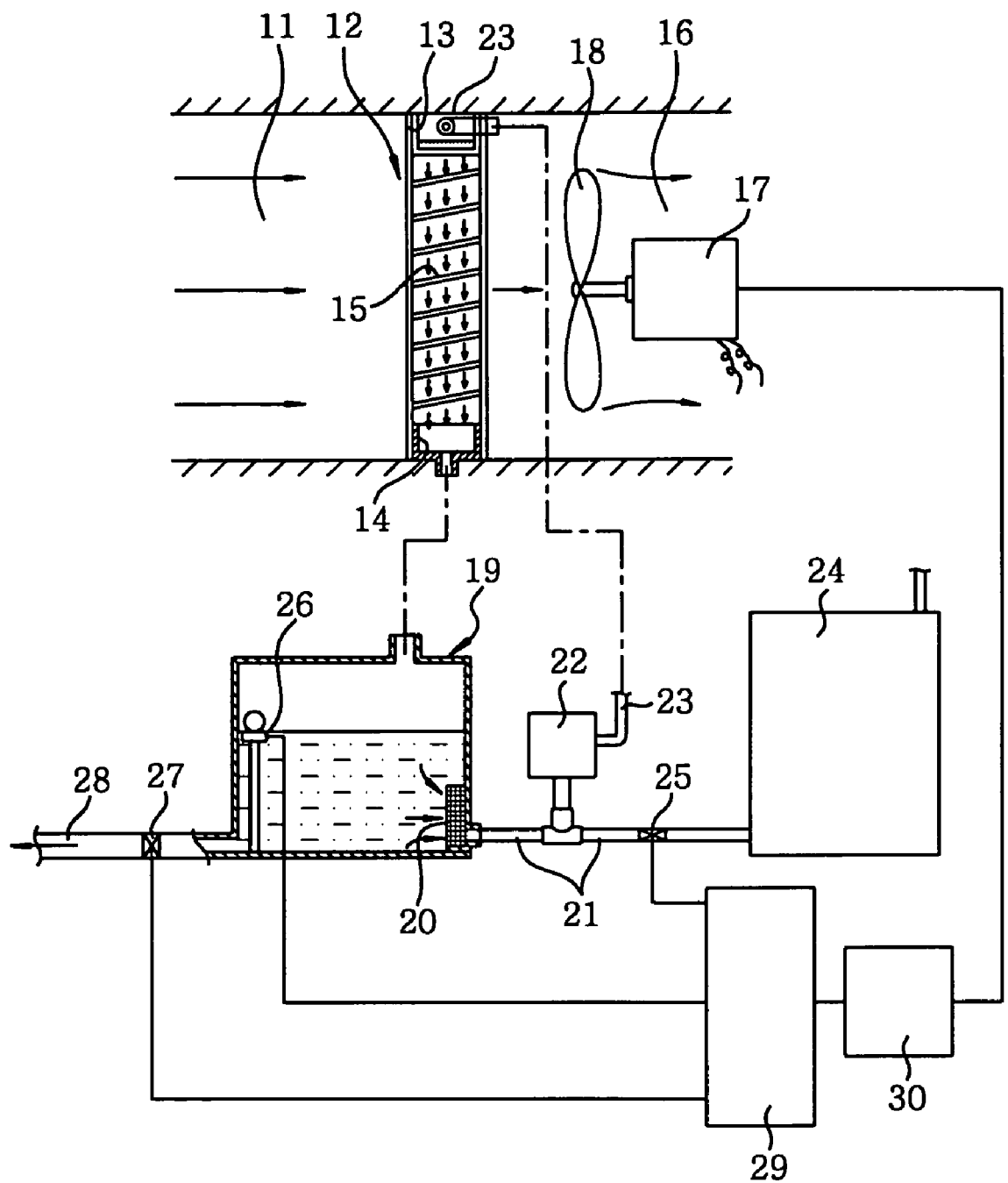
FIG. 1 illustrates a conventional wet type air cleaner.
Figure 2A:
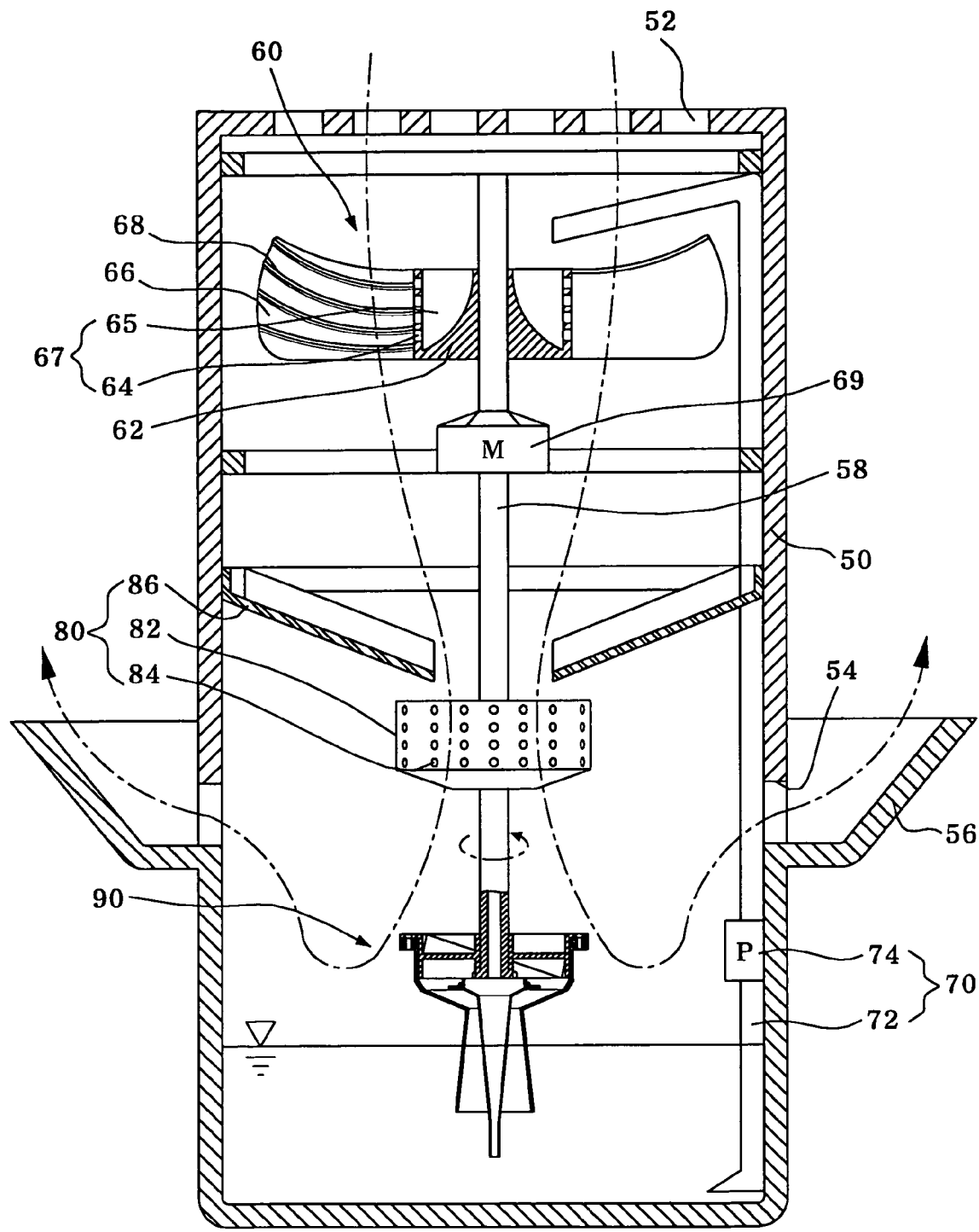
FIGS. 2A and 2B show sectional views of various types of a wet type air cleaner in accordance with the present invention.

Referring to FIG. 2A, there is shown a cross sectional view of a wet type air cleaner in accordance with the present invention. As shown in FIG. 2A, the wet type air cleaner includes a housing 50 provided with air inlets 52 and air outlets 54 and containing cleaning water therein; a blower unit 60 installed below the air inlets 52; a water supply unit 70 for supplying the cleaning water contained in the housing 50 into the blower unit 60; a sprinkling unit 80 installed below the blower unit 60; and a purification unit 90 installed below the sprinkling unit 80.

The housing 50 is of a cylindrical shape and contains the cleaning water therein. The air inlets 52 are provided at the top surface of the housing 50, and the air outlets 54 are provided at the sidewall of the housing 50. Further, a rotation shaft 58 is installed in a central portion of the housing 50. Specifically, the rotation shaft 58 is installed such that it is inserted passing through centers of the blower unit 60, the sprinkling unit 80 and the purification unit 90.

Further, the housing 50 has a water drain unit (not shown) for allowing contaminated cleaning water to be exhausted from the lower portion of the housing 50.

Further, the air outlets 54 are provided at the sidewall of the housing 50 to be positioned between the sprinkling unit 80 and the purification unit 90, and a condensing portion 56 is protruded from the lower ends of the air outlets 54 and is slantingly extended upward at a preset angle. By the presence of the condensing portion 56, only the purified air can be discharged out into the room while the cleaning water that has reached the air outlets 54 is condensed in the condensing portion 56, to fall inside the housing 50 again.

The water supply unit 70 includes a water supply line 72 extended from a lower end portion of the housing 50 to an upper portion thereof; and a pump 74 installed at one side of the water supply line 72 to pump up the cleaning water so that the cleaning water is supplied to a position above the blower unit 60.

The blower unit 60 is fixedly installed at the rotation shaft 58, and serves to draw the air into the air cleaner through the air inlet 52 while spraying the cleaning water falling down from the water supply line 72 toward the air, thus allowing dusts or harmful substances in the air to be adsorbed by the sprayed cleaning water. The blower unit 60 includes a fan main body 62 fixedly installed at a rotation shaft 58 to be rotated by a motor 69; a plurality of blades 66 formed at the outer peripheral surface of the fan main body 62 to rotate along with the fan main body 62 so as to draw the air through the air inlet 52; and a sprayer 67 formed at the fan main body 62 to spray the cleaning water into the air circulation passage.

Figure 3:
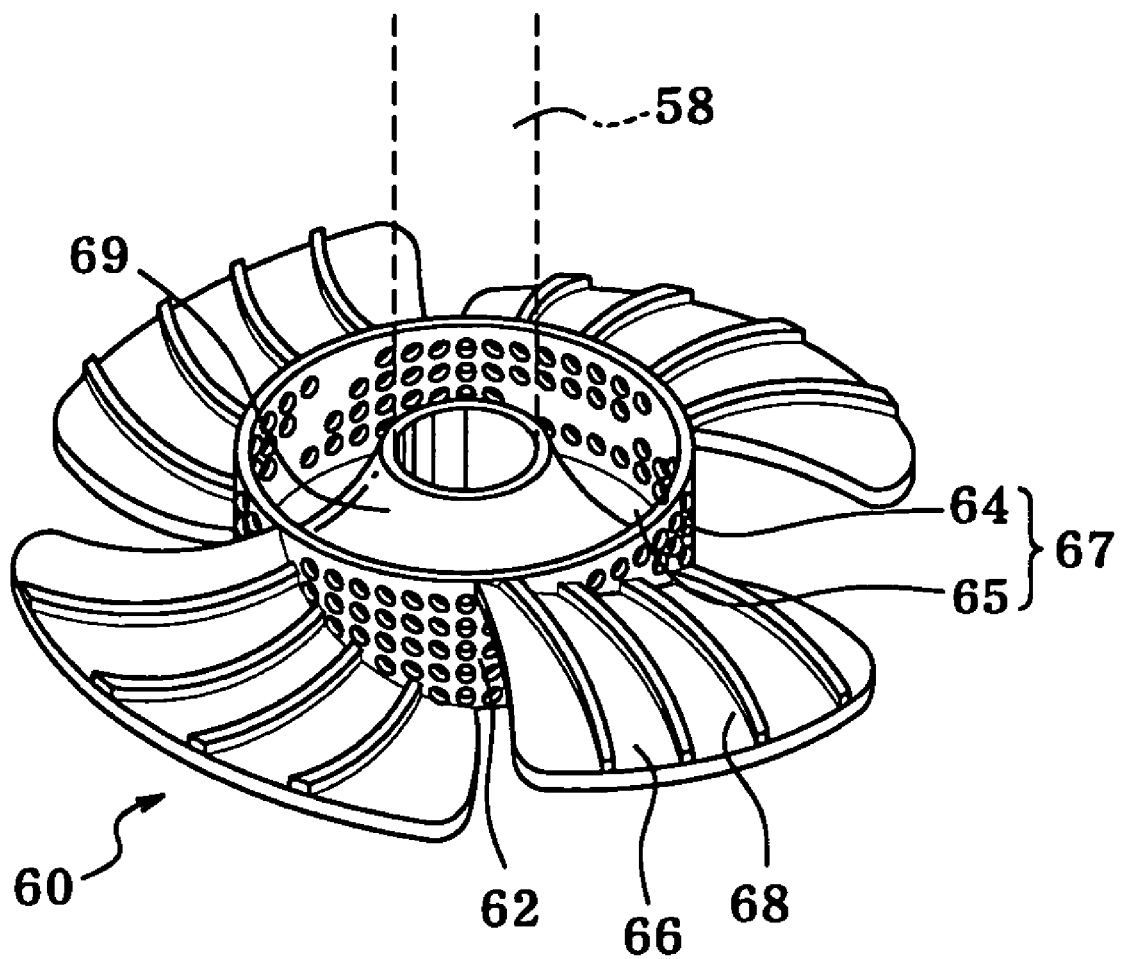
FIG. 3 is a detailed perspective view of the blower unit shown in FIGS. 2A and 2B.

As clearly shown in FIG. 3, each blade 66 is provided with a plurality of guides 68, wherein the guides 68 are elongated in a radial direction on the top surface of each blade 66. The presence of the guides 68 allows the cleaning water falling onto the top surfaces of the blades 66 to be dispersed in a circumferential direction of the fan main body 62. Therefore, the guides 68 are formed in curved shapes to be conformable to the shapes of the blades 66, thus facilitating the dispersion of the cleaning water.

Further, the sprayer 67 includes a water storage tub 65 concavely formed downward from the top surface of the fan main body 32, for storing therein the cleaning water falling from the water supply line 72; and a number of water jetting holes 64 provided on the peripheral surface of the water storage tub 65, for jetting the cleaning water contained in the water storage tub 65 in the circumferential direction of the fan main body 62 by a centrifugal force generated in the fan main body 62.

At its central portion, the water storage tub 65 has an opening into which the rotation shaft 58 is inserted, and an inclined surface 69 whose height decreases from the center toward the periphery thereof. Thus, by help of the presence of the inclined surface 69, the cleaning water falling into the central portion of the fan main body 62 is slidely moved toward the peripheral portion of the water storage tub 65 to be dispersed in the radial direction of the fan main body 62.

Furthermore, the sprinkling unit 80 is also fixedly installed at the rotation shaft 58 inserted therethrough, and it has a cylindrical shape with an open top. The sprinkling unit 80 includes a drum 82 provided with a number of discharge holes 84 in its peripheral surface; and a collection line 86 slantingly extended from the inner wall of the housing 50 to the space above the drum 82 to collect droplets into the drum 82.

Figure 4:
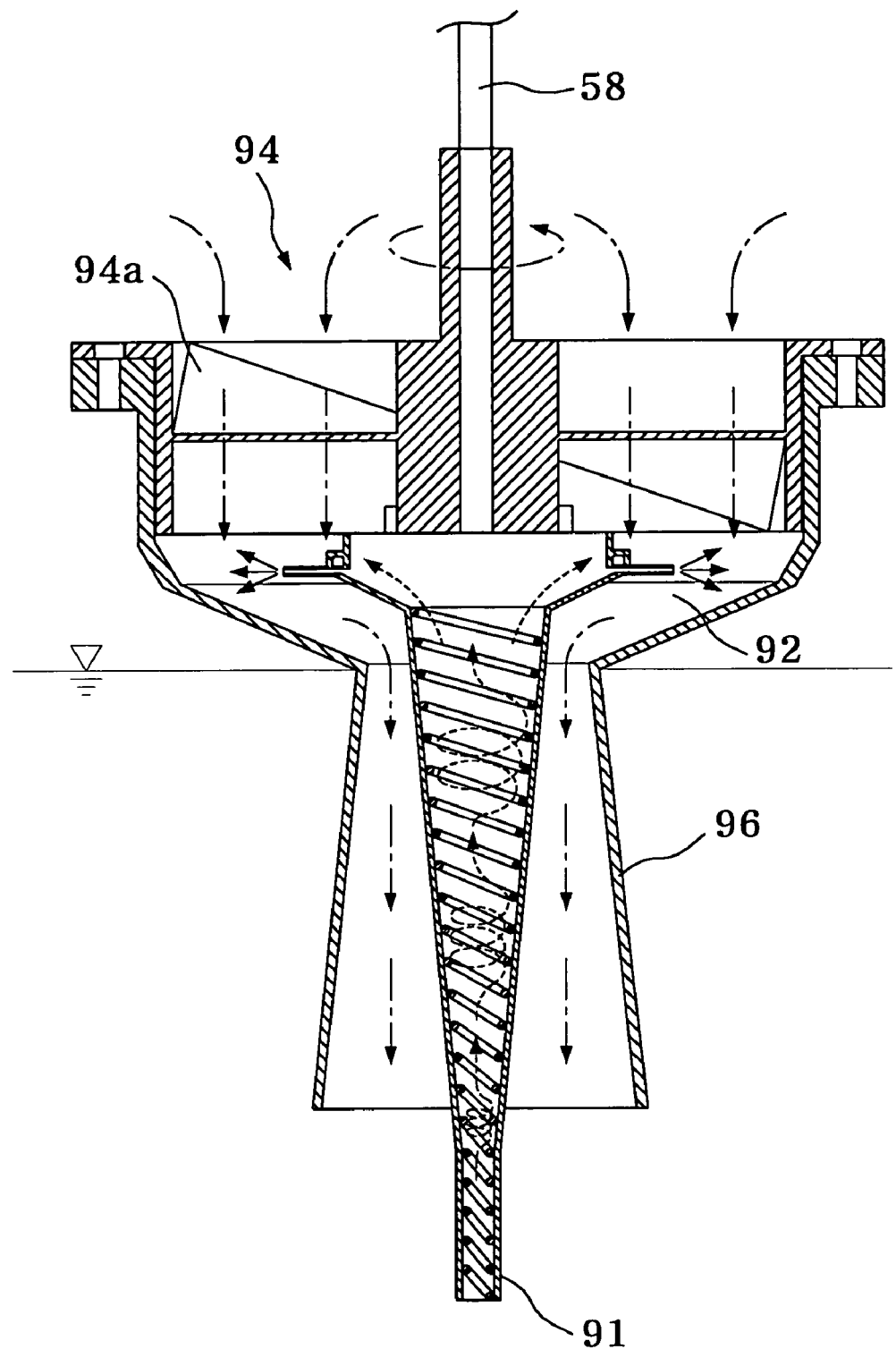
FIG. 4 is a detailed perspective view of a purification unit shown in FIG. 2A.

The purification unit 90 is installed below the sprinkling unit 80 such that a portion of the purification unit 90 is submerged in the cleaning water, and serves to suck up the cleaning water and to disperse it into the housing. As best shown in FIG. 4, the purification unit 90 includes an inner guide portion 91 whose lower end is submerged in the cleaning water and which has a funnel shape such that the cleaning water is moved upward by the centrifugal force; a water jetting nozzle 92 connected with the upper end of the inner guide portion 91 to spray the cleaning water supplied thereto; a blower unit 94 incorporating a fan 94a fixedly installed at the rotation shaft 58 to send the air downward; and an outer guide portion 96 installed outside the inner guide portion 91 with a gap therebetween to direct the air sent downward by the blower unit 94 and the dispersed cleaning water into the cleaning water contained in the housing 50.

Figure 2B:
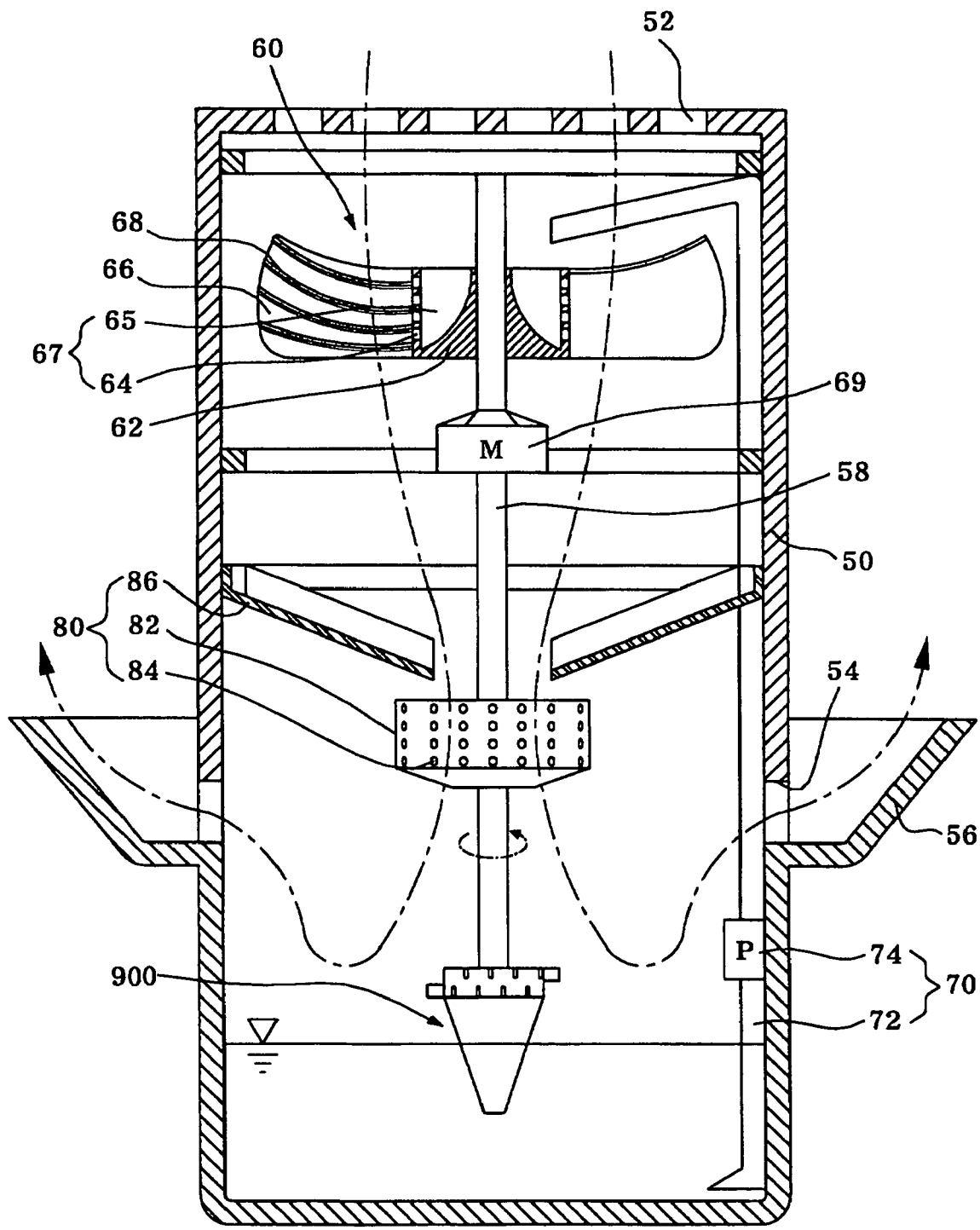

On the other hand, FIG. 2B shows another type of a wet type air cleaner in accordance with the present invention. In this connection, the configuration shown in FIG. 2B is identical to that shown in FIG. 2A except that the purification units 90 and 900 are different from each other in their shape. Therefore, a description of the same components as those in the first embodiment will be omitted for the sake of simple explanation.

An operation of the wet type air cleaner having the above-described configuration will be explained as follows.

Upon power up, the motor 69 is driven to rotate the blower unit 60, so that air is introduced from the air inlets 52. Thus introduced air is downward directed into the cleaning water contained in the housing 50 by the purification unit 90 after passing through the sprinkling unit 80. While the air contacts the water, foreign substances contained in the air are adsorbed by the cleaning water, and thus purified air is re-circulated into the room through the air outlets 54.

At this time, the cleaning water supplied to the position above the blower unit 60 via the water supply line 72 is collected in the water storage tub 65 and then dispersed through the discharge holes 64 by the centrifugal force to contact the air being introduced, while adsorbing foreign substances therefrom. Further, the cleaning water sprayed generates negative ions by colliding to the inner wall of the housing 50.

Thereafter, the cleaning water falling downward is introduced into the drum 82 by the collection line 86 and is discharged again through the discharge holes 84, while adsorbing foreign substances from the air drawn by the purification unit 90. Therefore, the efficiency of removing the foreign substances further improves.

In addition, in the purification unit 90, the air sent downward by the blower unit 94 is further filtered passing through the dispersed cleaning water by the water jetting nozzle 92. And then, the air is directed into the cleaning water in the bottom portion of the housing 50, whereby the contact between the air and the cleaning water is maximized, so that the noxious substances in the air can be removed by the cleaning water again before discharged through the air outlets 54. Consequently, pleasant indoor environment can be created.

In the wet type air cleaner configured as described above in accordance with the present invention, the air inlets are provided in the top surface of the housing, while the air outlets are formed in the sidewall of the housing. Then, by rendering indoor air suctioned through the air inlets to be directed into cleaning water contained in the housing, the contact area between the air and the cleaning water can be maximized, thus improving the air purifying efficiency.

Moreover, by installing the blower unit and the plurality of spray units at the rotation shaft disposed in the central portion of the housing, the blower unit and the spray units can be rotated simultaneously, so it becomes possible to circulate the air while dispersing the cleaning water at the same time. Further, with this configuration, since the air cleaner can be reduced in its size, it can be installed in various locations more easily.

While the invention has been shown and described with respect to the preferred embodiments, it will be understood by those skilled in the art that various changes and modifications may be made without departing from the spirit and scope of the invention as defined in the following claims.

What is claimed is:

1. A wet type air cleaner comprising:
   a housing provided with an air inlet at a top surface thereof and one or more air outlets at a lateral surface thereof, the housing containing cleaning water therein;
   a first blower unit, fixedly installed at a rotation shaft and having a spray unit incorporated thereon, for forcing air introduced through the air inlet to blow downward while dispersing the cleaning water supplied thereto;
   a water supply unit for supplying the cleaning water contained in the housing to the spray unit, to thereby allow the cleaning water to be sprayed so as to contact the air introduced through the air inlet, while adsorbing foreign substances contained in the air; and
   a purification unit installed below the first blower unit, a portion of the purification unit being submerged in the cleaning water such in a manner that the cleaning water is sucked up and dispersed into the housing,
   wherein the purification unit includes:
   an inner guide portion whose lower end is submerged in the cleaning water, the inner guide portion having a funnel shape whose width is narrowed from top to bottom;
   a water jetting nozzle connected with an upper end of the inner guide portion;
   a second blower unit installed at the rotation shaft for forcing the air to blow downward; and
   an outer guide portion installed outside the inner guide portion with a gap maintained therebetween to direct the air drawn downward by the second blower unit and the cleaning water dispersed by the spray unit into the cleaning water contained in the housing.

2. The air cleaner of claim 1, further comprising a sprinkling unit installed below the first blower unit, for secondarily dispersing the cleaning water falling downward after being dispersed by the first blower unit.

3. The air cleaner of claim 2, wherein the sprinkling unit includes a cylindrical drum with an open top installed at the rotation shaft and provided with a number of discharge holes in its peripheral surface; and a collection line slantingly extended upward toward an inner sidewall of the housing.

4. The air cleaner of claim 1, wherein the water supply unit includes a water supply line extended from a lower end portion of the housing to a position above the first blower unit; and a pump installed at one side of the water supply line to pump up the cleaning water.

5. The air cleaner of claim 1, wherein the housing further includes a condensing portion, protruded from lower ends of the air outlet and slantingly extended upward at a preset angle, wherein the cleaning water that has reached the air outlets is condensed by the condensing portion, to thereby fall inside the housing again.

6. The air cleaner of claim 2, wherein the air outlets are provided at the sidewall of the housing to be located between the sprinkling unit and the purification unit.

* * * * *